United States Patent
Chandrasekhar et al.

(10) Patent No.: US 9,756,654 B2
(45) Date of Patent: Sep. 5, 2017

(54) TIMER-BASED SCHEME FOR USER EQUIPMENT QUEUE STATE ESTIMATION

(71) Applicant: CISCO TECHNOLOGY, INC., San Jose, CA (US)

(72) Inventors: Vikram Chandrasekhar, Mountain View, CA (US); Kedar D. Shirali, Sunnyvale, CA (US); Ritesh K. Madan, Berkeley, CA (US); Qing Zhao, Fremont, CA (US); Sushanth Chandappa Kulal, Mangalore (IN)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 14/925,750

(22) Filed: Oct. 28, 2015

(65) Prior Publication Data
US 2017/0127441 A1 May 4, 2017

(51) Int. Cl.
*H04W 28/02* (2009.01)
*H04W 72/12* (2009.01)

(52) U.S. Cl.
CPC ... *H04W 72/1289* (2013.01); *H04W 28/0278* (2013.01)

(58) Field of Classification Search
CPC .................. H04W 72/1289; H04W 28/0278
See application file for complete search history.

(56) References Cited

U.S. PATENT DOCUMENTS

| | | | |
|---|---|---|---|
| 2009/0285196 A1* | 11/2009 | Lee | H04L 47/14 370/345 |
| 2010/0034147 A1 | 2/2010 | Ho et al. | |
| 2011/0026625 A1* | 2/2011 | Susitaival | H04W 52/0251 375/260 |
| 2011/0199991 A1 | 8/2011 | Harris et al. | |
| 2012/0039169 A1 | 2/2012 | Susitaival et al. | |
| 2012/0127891 A1 | 5/2012 | Landstrom et al. | |
| 2012/0176984 A1 | 7/2012 | Susitaival et al. | |
| 2012/0327799 A1 | 12/2012 | Sandlund et al. | |
| 2013/0021917 A1 | 1/2013 | Chen et al. | |

(Continued)

OTHER PUBLICATIONS

Mehta, et al., "Buffer-Based Channel dependent UpLink Scheduling in a Relay-Assisted LTE Networks," Infonet Lab., Department of Electrical Engineering Indian Institute of Technology Bombay, Mumbai, India, Apr. 2012, 5 pages; https://www.ee.iitb.ac.in/~karandi/pubs_dir/conferences/mahima_suman_abhay_wcnc2012.pdf.

(Continued)

*Primary Examiner* — Omar Ghowrwal
(74) *Attorney, Agent, or Firm* — Patterson + Sheridan LLP

(57) ABSTRACT

Embodiments include starting a first timer if a queue state associated with a user equipment (UE) is estimated to equal zero bytes of data and if a last buffer status report received from the UE indicated the queue state to be greater than zero bytes of data, sending a control message granting uplink resources to the UE if the first timer expires, and determining the queue state associated with the UE based, at least in part, on a response to the control message. In specific embodiments the first timer expires if neither a scheduling request nor a buffer status report is received during a first timer interval after the first timer is started. Further embodiments include stopping the first timer if a scheduling request or a buffer status report is received before the first timer expires.

20 Claims, 5 Drawing Sheets

(56) References Cited

U.S. PATENT DOCUMENTS

| | | | |
|---|---|---|---|
| 2013/0028223 A1* | 1/2013 | Kim | H04L 5/0007 |
| | | | 370/329 |
| 2013/0044699 A1 | 2/2013 | Eriksson | |
| 2013/0083677 A1* | 4/2013 | Kim | H04W 72/1284 |
| | | | 370/252 |
| 2013/0294337 A1 | 11/2013 | Damnjanovic et al. | |
| 2014/0295865 A1 | 10/2014 | Fantaye et al. | |
| 2015/0092541 A1 | 4/2015 | Yang et al. | |
| 2015/0092542 A1 | 4/2015 | Yang et al. | |
| 2015/0280891 A1 | 10/2015 | Wiemann | |
| 2016/0044737 A1* | 2/2016 | Kwon | H04W 76/046 |
| | | | 370/328 |
| 2016/0081109 A1* | 3/2016 | Li | H04W 28/0278 |
| | | | 370/329 |

OTHER PUBLICATIONS

"A Discrete-Event Network Simulator ns-3.18@6a61cc0b92a0 Design Document Overview," Design Documentation—Model Library, NS-3 Consortium, Aug. 29, 2013; 116 pages; https://www.nsnam.org/docs/release/3.18/models/html/lte-design.html.

Pasupuleti, Kumar Swamy, "Buffer Status Reporting Procedure," How LTE Stuff Works, Jun. 23, 2014, 6 pages; http://howltestuffworks.blogspot.com/2014/06/buffer-status-reporting-procedure.html.

* cited by examiner

US 9,756,654 B2

TIMER-BASED SCHEME FOR USER EQUIPMENT QUEUE STATE ESTIMATION

TECHNICAL FIELD

This disclosure relates in general to the field of radio communications, and more particularly, to a timer-based scheme for user equipment queue state estimation.

BACKGROUND

In telecommunications, Long-term evolution (LTE) is a standard for wireless communication of high speed data for mobile devices and data terminals. It is based on Global System for Mobile Communications (GSM), Enhanced Data rates for GSM Evolution (EDGE), Universal Mobile Telecommunications System (UMTS) and High Speed Packet Access (HSPA) network technologies. Capacity and speed can be increased using a different radio interface with core network improvements. Mobile networks are divided into cell areas where each cell area is served by an access point. An access point includes a hardware element that may also be known as an Evolved Node B (eNodeB) in an LTE mobile network. An eNodeB communicates directly with user equipment (UE) such as mobile devices. During uplink scheduling for a UE, an eNodeB estimates the queue size in the UE on a per logical channel group (LCG) basis so that it can determine how many resources to assign to the UE if scheduled. An eNodeB scheduler typically estimates the UE's queue size based upon previously received buffer status reports and reception of Scheduling Requests (SRs) from that UE. In some circumstances, however, the eNodeB may infer erroneously that the UE's queue state estimate UE is zero, even if such is not the case. This may cause delays and a diminished user experience. Minimizing end-to-end delays and efficiently using resources presents challenges to network operators, component manufacturers and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
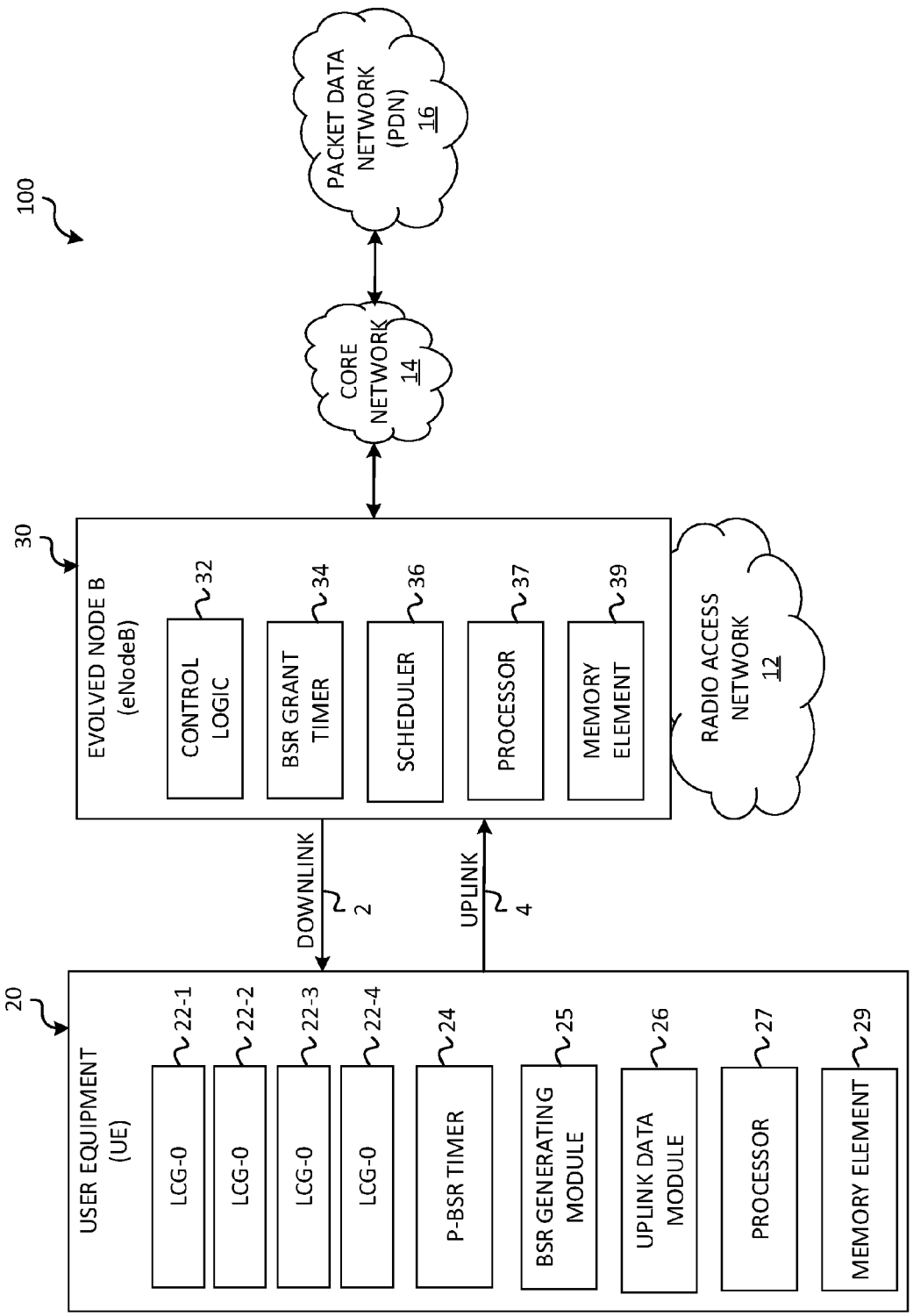
FIG. 1 is a simplified block diagram of a communication system for estimating queue states of user equipment in a mobile network environment according to at least one embodiment of the present disclosure.

The present disclosure describes methods of using a timer-based scheme for user equipment queue state estimation. In one example, a method is provided in the present disclosure and includes starting a first timer if a queue state associated with a user equipment (UE) is estimated to equal zero bytes of data and if a last buffer status report received from the UE indicated the queue state to be greater than zero bytes of data. The method also includes sending a control message granting uplink resources to the UE if the first timer expires and determining the queue state associated with the UE based, at least in part, on a response to the control message.

In a specific embodiment, the first timer expires if neither a scheduling request nor a buffer status report is received during a first timer interval after the first timer is started. Also, the control message can be sent to the UE if a scheduling request is received before the first timer expires.

In a further specific embodiment, the method includes receiving a response to the control message from the UE and updating a queue state estimate based on a new buffer status report if the new buffer status report is included in the response. The new buffer status report can be triggered on the UE when a second timer on the UE expires before the first timer expires. If a buffer status report is not included in the response to the control message, the queue state estimate can be updated to equal zero.

In a further specific embodiment, the method includes prioritizing the UE to receive the control message over other user equipments (UEs) for which control messages have not been triggered. The prioritizing the UE can include bypassing a computation of scheduling metrics that ranks the other UEs for which control messages have not been triggered. In another embodiment, the UE is prioritized to receive the control message over the other UEs by assigning a higher weight to the UE during a computation of scheduling metrics that ranks the UE and the other UEs.

In a further specific embodiment, the method further includes determining whether a number of control messages to be sent to respective user equipments (UEs) exceeds a threshold and multiplexing the control messages across two or more transmission time intervals if the number exceeds the threshold. If a new buffer status report is received before the first timer expires, the control message is not sent and the first timer is stopped. The queue state can be based on a number of bytes within logical channel groups of an uplink queue in the UE in a specific embodiment. In a further embodiment, the method includes configuring a second timer on the UE so that, when started, the second timer runs based on a second timer interval, where a first timer interval of the first timer is defined to ensure that the second timer interval expires before the first timer. In a further specific embodiment, an evolved node B (eNodeB) starts the first timer and sends the control message to the UE. In yet another embodiment, the method includes stopping the first timer if a scheduling request or a buffer status report is received before the first timer expires.

Some or all of the elements, operations, and features may be included in respective systems, apparatuses, and devices for performing the described functionality. Furthermore, some or all of the features may be implemented in at least one machine readable storage medium.

Description

It should be noted that the embodiments described herein are not limited to implementation in an eNodeB in an LTE network and may be applied to any radio access network (RAN) technology that supports buffer status reporting from a set of served devices to their serving access point and that experiences some instances of deadlock, as will be further described herein. Furthermore, the embodiments may also be applied to other types of queue state estimates of one node by another node where buffer status reports can be communicated and deadlock can occur.

FIG. 1 is a simplified block diagram of a communication system 100 for queue state estimation of user equipment in a mobile network environment. In FIG. 1, user equipment (UE) 20 is communicatively coupled to an access point, such as Evolved Node B (eNodeB) 30, via wireless signals such as radio. The eNodeB 30 can be communicatively coupled to a core network 14, which can facilitate communication exchanges between UE 20 and other user equipment and networks such as a packet data network 16. UE 20 includes four logical channel groups, LCG-0, LCG-1, LCG-2, and LCG-3, which are referenced, respectively, as 22-1, 22-2, 22-3, and 22-4. UE 20 also includes a periodic buffer status report (P-BSR) timer 24, a buffer status report generating module 25, an uplink data module 26, and appropriate hardware including at least a processor 27 and a memory element 29. The eNodeB 30 can include control logic 32, a buffer status report (BSR) grant timer 34, and a scheduler 36. Additionally, eNodeB 30 also includes appropriate hardware including at least a processor 37 and a memory element 39.

Communications in communication system 100 may be referred to herein as 'network traffic' or 'traffic', which may be inclusive of packets. Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), protocol data units (PDU), etc.). Suitable communication messaging protocols may have multiple communication layers, including at least a data link layer, which is referred to herein as layer 2 (L2). Generally, L2 sets up links across the physical network and transfers data between adjacent nodes using unique physical (i.e., hardware) addresses. In at least one embodiment, these physical addresses (i.e., L2 addresses) can be media access control (MAC) addresses and protocol data units (PDUs) can be generated to deliver information between peers such as eNodeB 30 and UE 20.

A PDU is a unit of data, and can contain both control information (e.g., source addresses, destination addresses, etc.) and data. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise PDUs.

For purposes of illustrating certain example techniques of a communication system involving an access point and user equipment in a mobile network environment, it is important to understand the communications that may be traversing the network and the protocols used in effecting such communications. The following foundational information may be viewed as a basis from which the present disclosure may be properly explained.

In an LTE network, an access point can include an eNodeB that is communicatively coupled to multiple UEs and that estimates a UE queue size for each UE on a per logical channel group basis for uplink scheduling (e.g., from UE to mobile core network). A queue size is also referred to herein as a 'queue state' and the estimation by the eNodeB is referred to herein as a 'queue state estimate.' A queue state estimate can be used by the eNodeB to determine how many resources to assign to that UE if scheduled. Normally, the eNodeB updates and refines its queue state estimate via buffer status reports (BSRs) that are piggybacked on the uplink data that is sent by the UE in response to uplink grants from the eNodeB.

Under certain circumstances, however, the triggering conditions for transmission of buffer status reports and scheduling requests from a UE are not satisfied and can result in the eNodeB erroneously inferring that the queue size at that UE equals zero, even if the UE has a non-zero number of bytes in one or more of its logical channel queues. In such a scenario, the eNodeB may not assign any resources to that UE (as the eNodeB estimates a zero queue state at the UE), yet the UE may keep receiving data on its logical channel queues without triggering a regular BSR. In at least some cases, the UE could experience poor quality of experience arising from not getting uplink scheduling resources, thus leading to its data either being dropped and/or not being delivered within a reasonable amount of time.

A more detailed description of this operation is now provided. Three types of BSRs can be provided in an LTE network: regular BSR, periodic BSR (P-BSR), and padding BSR. A UE reports its BSRs to an eNodeB on a per logical channel group (LCG) basis, where an LCG designates a set of logical channels for which the cumulative buffer size is reported. There are four LCGs numbered from 0 to 3 in a UE. The eNodeB updates its queue state estimate for the UE to reflect queue state information in the latest BSR that has been received from the UE. The eNodeB also keeps track of its estimated queue state for each served UE by updating it based on uplink grants sent to each served UE from the eNodeB.

A regular BSR can be triggered by any of the following events: 1) When uplink data for a logical channel (in an LCG) becomes available for transmission and there is no data available for transmission in any LCG; 2) When uplink data for a logical channel becomes available for transmission and the data belongs to a channel with a higher priority than other logical channels with non-zero data; and 3) when a retxBSR timer expires after a UE has transmitted a BSR to the eNodeB but the UE never received a subsequent uplink grant. A retxBSR timer provides a reactive mechanism by a UE to inform an eNodeB to send an uplink grant for the UE to send is data. Upon triggering of a regular BSR, a scheduling request (SR) is sent by the UE, at pre-defined transmission opportunities, to request uplink resources for transmitting its data on the uplink. A padding BSR can be generated at the UE in an asynchronous manner and is triggered when the UE has uplink resources that are allocated and the number of padding bits is sufficient to contain a BSR.

A periodic BSR is generated at the UE in a synchronous manner and is triggered based on the expiry of a periodic BSR (P-BSR) timer, which is configured on the UE by the eNodeB. A P-BSR timer is supposed to generate a new estimate of the UE's buffer status based on a pre-defined period or interval that is configured by the eNodeB. However, the UE does not actually send a P-BSR unless a grant from the eNodeB is given. When an uplink grant is received by the UE, the UE first checks if a P-BSR has been triggered. If a P-BSR has been triggered, then the data to be sent in a protocol data unit (PDU) can be assembled by putting the P-BSR in the PDU first. A P-BSR is typically three bytes (or 24 bits) such that the amount of data in each LCG is indicated by six bits of the 24 bits.

Configuring a P-BSR timer may not always suffice to ensure that the eNodeB receives non-zero buffer status reports of the UE when the eNodeB has estimated the queue state of the UE to be zero. Typically, when an eNodeB estimates the queue state of a UE to be zero bytes, the eNodeB just waits for an SR from that UE, per the triggering conditions previously described herein, in order to infer that new data has arrived at that UE.

In some scenarios, however, a regular BSR will not be triggered at the UE and, therefore, an SR will not be sent. This scenario can occur when an eNodeB estimates that a UE of interest has zero bytes in all of its LCGs, but at least one of the LCGs actually has data (i.e., non-zero bytes) available for transmission. In such a scenario, any arrival of new data at a logical channel (in that LCG) will not trigger a regular BSR. Due to the mistaken queue state estimation of zero bytes, the eNodeB does not schedule the UE in subsequent transmission time intervals (TTIs). If new data keeps arriving at a logical channel that has non-zero bytes, no SR is triggered at the UE since that LCG queue size was non-zero at the time the eNodeB mistakenly estimated the UE queue state as having zero bytes in all of its LCGs. Also, even though data in at least one logical channel queue continues to be available for transmission, a regular BSR is not generated and hence SR is not transmitted, unless new data arrives at a logical channel queue that has higher priority than the one for which data is already available.

The eNodeB does not schedule the UE when the queue state estimate for that UE is zero and the eNodeB has not received an SR. Since the eNodeB does not schedule the UE, the UE cannot send its P-BSR, if triggered. Because the UE has no uplink resources to send a P-BSR and because no SR is triggered by the UE, the UE has no means of informing the eNodeB of its non-zero queue state via a BSR (i.e., regular BSR, P-BSR, or padding BSR) or SR. Consequently, a deadlock/stall situation may occur when the eNodeB estimates a UE queue state to be zero bytes, but the UE actually has non-zero bytes.

A deadlock/stall scenario can result in higher end-to-end delays for a UE. Thus, the UE may experience poor uplink and downlink TCP throughputs and increased delays for delay-sensitive traffic. One way to minimize the impact of the aforementioned stall situation is to simply assign one large grant to the UE whenever the eNodeB's estimated queue size at the UE is close to zero to increase the probability that the UE can flush its logical channel queue and send a zero-valued BSR. Such a process potentially wastes precious radio resources and therefore, uplink capacity. This is particularly true when the UE has only a small amount of pending uplink data and in such a case, the resources reserved for sending a large grant to that UE could have been more effectively and efficiently used to serve a different UE with larger amounts of pending uplink data.

Embodiments of a communication system as described herein can resolve the aforementioned issues (and more) associated with estimating a UE queue state. Embodiments disclosed herein offer a timer-based mechanism for an eNodeB scheduler to infer a UE's queue state via dedicated buffer status reports. Embodiments enable an eNodeB to detect a non-zero amount of data at a UE due to either pending data or the arrival of new data, even though the eNodeB has estimated the queue state of the UE to be zero bytes. Specifically, the eNodeB maintains a state as to whether a P-BSR has been triggered at the UE since the last uplink grant and then proactively sends a control message to allocate uplink resources so that the eNodeB can receive a P-BSR to infer the UE's actual queue state. In at least one embodiment, this is achieved by maintaining a timer (also referred to herein as a 'buffer status report grant timer' and 'BSR grant timer') at the eNodeB. The timer has an expiry interval large enough so that whenever the eNodeB grants uplink resources to a UE at an appropriate time, the UE is guaranteed to send a P-BSR. In order to pull a P-BSR, upon the expiry of the BSR grant timer, the eNodeB sends a control message that allocates resources to the UE. In at least one embodiment, this control message can be a small uplink grant. This resolves the deadlock/stalls since, upon reception of the P-BSR, both the eNodeB and the UE are 'in-sync' about the UE's queue state. Thus, the scheduling delay can be reduced since the eNodeB can schedule this UE without having to wait for other events (e.g., scheduling requests) to occur. It should be noted that, as used herein, references to a 'buffer status report' and/or 'BSR' are intended to include any report, message, file, communication, or other data that indicates a queue state of a particular device. Examples include, but are not limited to, Buffer Status Reports generated in an LTE network.

Several advantages are provided by embodiments disclosed herein. First, embodiments disclosed herein help minimize slow start behavior of Transmission Control Protocol (TCP) whenever a deadlock situation occurs, where an eNodeB estimates a UE's queue state is zero but the UE's queue state is actually non-zero and the eNodeB stops sending uplink grants to the UE. Slow start behavior of TCP can typically occur due to the following events a) delay in reception of TCP acknowledgements triggered at the UE in response to TCP packets transmitted from the eNodeB to the UE and b) delay in transmission of TCP packets transmitted from the UE to the eNodeB. Any delay of the order of a few hundred milliseconds, incurred due to lack of uplink resources for scheduling at that UE, leads to potential TCP timer expiry and the subsequent slow start behavior. This problem is addressed in embodiments disclosed herein at least in part by the addition of control logic at the eNodeB in terms of determining the triggering conditions at which the eNodeB sends a control message to grant uplink resources to the UE. Further advantages of embodiments disclosed herein include ease of implementation and faster response times to resolving deadlock/stall situations. In addition, embodiments according to the present disclosure help minimize end-to-end latencies of user traffic, which helps improve the user quality of experience.

Turning to FIG. 1, a description of the infrastructure of communication system 100 is now provided. Generally, communication system 100 is implemented in a mobile network environment and represents a series of points, nodes, or network elements of interconnected communication paths for receiving and transmitting packets of information that propagate through one or more networks. These nodes offer communicative interfaces between sources, destinations, and intermediate nodes. A network can comprise any number of hardware and/or software elements coupled to (and in communication with) each other through a communication medium.

Packet data network 16 may include any networks such as the Internet, private corporate networks, IP multimedia subsystems, etc. Such networks can include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof, including wired and/or wireless communication.

One or more radio access networks (e.g., radio access network 12) and one or more core networks (e.g., core network 14) in communication system 100 enable wireless communications in a cellular network or cellular communication system. A cellular network is distributed over a geographical area divided into different land areas called cells. Each cell can be served by an access point. An access point may serve one or more cells and may support one or more communication technologies. An access point communicates with user equipment over an air interface operating on radio frequencies within range of the access point.

The cellular network may be implemented in accordance with a wireless communication standard of high-speed data for mobile devices and data terminals. One particular wireless communication standard that may be used is Long-Term Evolution (LTE), also referred to as 4G LTE, which was developed by the $3^{rd}$ Generation Partnership Project organized by several telecommunications standard development organizations. Generally, an LTE network architecture can include user equipment (e.g., UE 20), a radio access network (e.g., radio access network 12), and an evolved packet core (e.g., core network 14). The evolved packet core can communicate with packet data networks (e.g., PDN 16) and other radio access networks. In one possible implementation, a radio access network is an evolved UMTS Terrestrial Radio Access Network (E-UTRAN) that includes at least one access point such as an evolved node B (e.g., eNodeB 30).

An access point is a network element that can facilitate communications between a transmitting/receiving unit, such as UE 20, and one or more core networks. As used herein, the term 'network element' is meant to encompass processors, modules (any of which may be physical or virtually implemented on physical hardware), eNodeBs, base transceiver stations, base stations, radio base stations, or any other suitable device, component, element, or object that is operable to relay information to and from a transmitting/receiving unit such as UE 20. A network element may include any suitable hardware, software, components, modules, interfaces, or objects that facilitate the operations thereof. This may be inclusive of appropriate algorithms and communication protocols that allow for the effective exchange of data or information.

UE 20 can be associated with devices or nodes that are enabled to communicate voice, audio, video, media, and/or data wirelessly in a cellular network, via a radio access network such as radio access network 12. Such communication may occur, for example, between UE 20 and one or more other UEs, between UE 20 and a server, or between UE 20 and any other device, component, element or object capable of communicating with UE 20 via a radio access network and possibly a core network and a packet data network. The terms 'user equipment' and 'UE' are inclusive of devices used for such communications including a laptop computer, tablet, mobile device, smart phone, smart appliance, gaming device, vehicular device, server, or any other device, component, element, or object capable of communicating voice, audio, video, media, or data exchanges over an air interface to a radio access network within communication system 100. UE 20 may also be inclusive of a suitable interface to a human user, such as a display, a keyboard, a touchpad, a remote control, or other terminal equipment. UE 20 may also be any device that seeks to initiate a communication on behalf of another entity or element, such as a program, a database, or any other component, device, element, or object capable of communication exchanges within communication system 100.

UE 20 includes four logical channel groups, LCG-0, LCG-1, LCG-2, and LCG3, which each include a set of logical channels. These channels can receive data to be transmitted to eNodeB 30 when scheduling grants are received from the eNodeB. UE 20 may also include uplink data module 26 for generating a PDU with data and possibly a BSR to send on uplink 4 to eNodeB 30. In at least one embodiment, uplink 4 can be a physical uplink shared channel (PUSCH). P-BSR timer 24 in UE 20 triggers a periodic buffer status report, which is used to provide the eNodeB with an updated buffer status report. The P-BSR can be generated by BSR generating module 25. The generated P-BSR, however, is not provided to eNodeB unless uplink resources are granted by the eNodeB for the UE to send its BSR.

Each eNodeB facilitates radio communications between UEs in one or more cells and core network 14. An eNodeB may be directly connected to core network 14 using an S1 interface. Additionally, eNodeB 30 may be linked to other eNodeBs in the radio access network via an X2 interface. Core network 14 facilitates voice and data communications between the radio access network and other networks, such as packet data network 16 and other radio access networks. In one example, core network 14 represents an architecture that provides converged voice and data network traffic. The architecture may be implemented using any suitable protocol such as Internet Protocol (IP) for the voice and data traffic.

An eNodeB can communicate directly with UEs over an air interface of LTE. For example, eNodeB 30 can communicate with UE 20 by sending radio transmissions to UE 20 on downlink 2 and receiving radio transmissions from UE 20 on uplink 4. The eNodeB 30 includes scheduler 36 for scheduling uplink resources in the form of uplink grants sent to UE 20, so that UE 20 can send data from its queue and/or a BSR to eNodeB 30.

In at least one embodiment, eNodeB 30 may also include control logic 32 and BSR grant timer 34, which can work in conjunction with scheduler 36, to monitor and resolve possible deadlock situations between UE 20 and eNodeB 30. According to at least one embodiment disclosed herein, a deadlock may be resolved by configuring the P-BSR reporting at the UE, and sending a small grant to that UE whenever the eNodeB estimates the UE queue state equals zero bytes and a triggering condition is met, so as to trigger a P-BSR transmission by the UE and confirm the true UE queue state. Control logic 32 can be provisioned in eNodeB 30 to configure P-BSR timer 24 (e.g., using radio resource control (RRC) protocol) where the periodic BSR reporting is triggered by the expiration of P-BSR timer 24.

Control logic 32 can also be configured to determine triggering conditions as to when to send the small grant to pull in the UE's P-BSR. In at least one embodiment, BSR grant timer 34 is a timer mechanism provisioned at the eNodeB to trigger sending the small grant, in the form of a control message containing a small resource allocation. This control message is sent when the BSR grant timer expires so as to poll the UE, pull the UE's P-BSR, and update the eNodeB's queue state estimate. The purpose of the BSR grant timer is to obtain the UE's queue state when the eNodeB's queue state estimate of that UE equals zero bytes and when no SR is received and no zero-valued BSR is received from that UE in the last received BSR that confirms that UE's zero queue state.

In at least one embodiment, the P-BSR timer period can be 10 milliseconds (sf10). An example of code that may be used by eNodeB to configure a P-BSR timer on a UE is the following:

```
-- ASN1START
MAC-MainConfig : : =     SEQUENCE {
    Ul-SCH-Config        SEQUENCE {
        maxHARQ-Tx           ENUMERATED {
                                 n1, n2, n3, n4, n5, n6, n7, n8,
                                 n10, n12, n16, n20, n24, n28,
                                 spare2, spare1} OPTIONAL, -- Need ON
        periodicBSR-Timer    ENUMERATED {
                                 sf5, sf10, sf16, sf20, sf32, sf40, sf64, sf80,
                                 sf128, sf160, sf320, sf640, sf1280, sf2560,
                                 infinity, spare1} OPTIONAL, --Need ON
        retxBSR-Timer        ENUMERATED {
                                 sf320, sf640, sf1280, sf2560, sf5120,
                                 sf10240, spare2, spare1}
```

In at least one embodiment, control logic 32 may be configured with triggering criteria for a BSR grant timer and control message as follows. If, at any time t=T, the following conditions are met, start/restart a BSR grant timer at the eNodeB: (1) The eNodeB's queue state estimate at that UE=0 bytes; and (2) The most recent BSR for that UE is non-zero.

At any time t>T and t<T+BSR_GRANT_TIMER_INTERVAL, provided one or more of the following events occur, the BSR grant timer is reset when: (1) Any BSR (including a truncated BSR) is received; and/or (2) An SR is received. This SR indicates to the eNodeB that a regular BSR was triggered following the occurrence of one of the following two possible events: either higher priority data arrived at the UE when the UE already had data in one or more logical channel queues, or alternatively, new data arrived at the UE when all its logical channel queues were empty to begin with. If an SR is received, the eNodeB sends a control message granting uplink resources to the UE so that the UE can transmit its regular BSR in order to assist the eNodeB in determining the UE's queue state.

If the BSR grant timer expires, this indicates neither a BSR nor a SR was received at the eNodeB from that UE. Therefore, upon the BSR grant timer's expiry, the eNodeB could perform the following actions: (1) Send a control message granting uplink resources to the UE; and (2) Reset the BSR grant timer.

If, in response to a control message, a BSR (which may have been generated as a P-BSR, a regular BSR or a padding BSR) is received in a PUSCH response, then if the BSR indicates the UE queue has zero bytes in all LCGs, the eNodeB can wait for an SR to consider that UE for scheduling. Otherwise, the eNodeB resumes unicast scheduling based on the reported queue state. If the PUSCH response is received without a P-BSR, a regular BSR, or padding BSR, the eNodeB should assume that the grant was large enough to empty the LC buffers at the UE. Thus, the scheduler can assume an implicit BSR indicating the queue state as zero bytes at the UE and can wait for a subsequent SR from that UE.

Figure 2A:
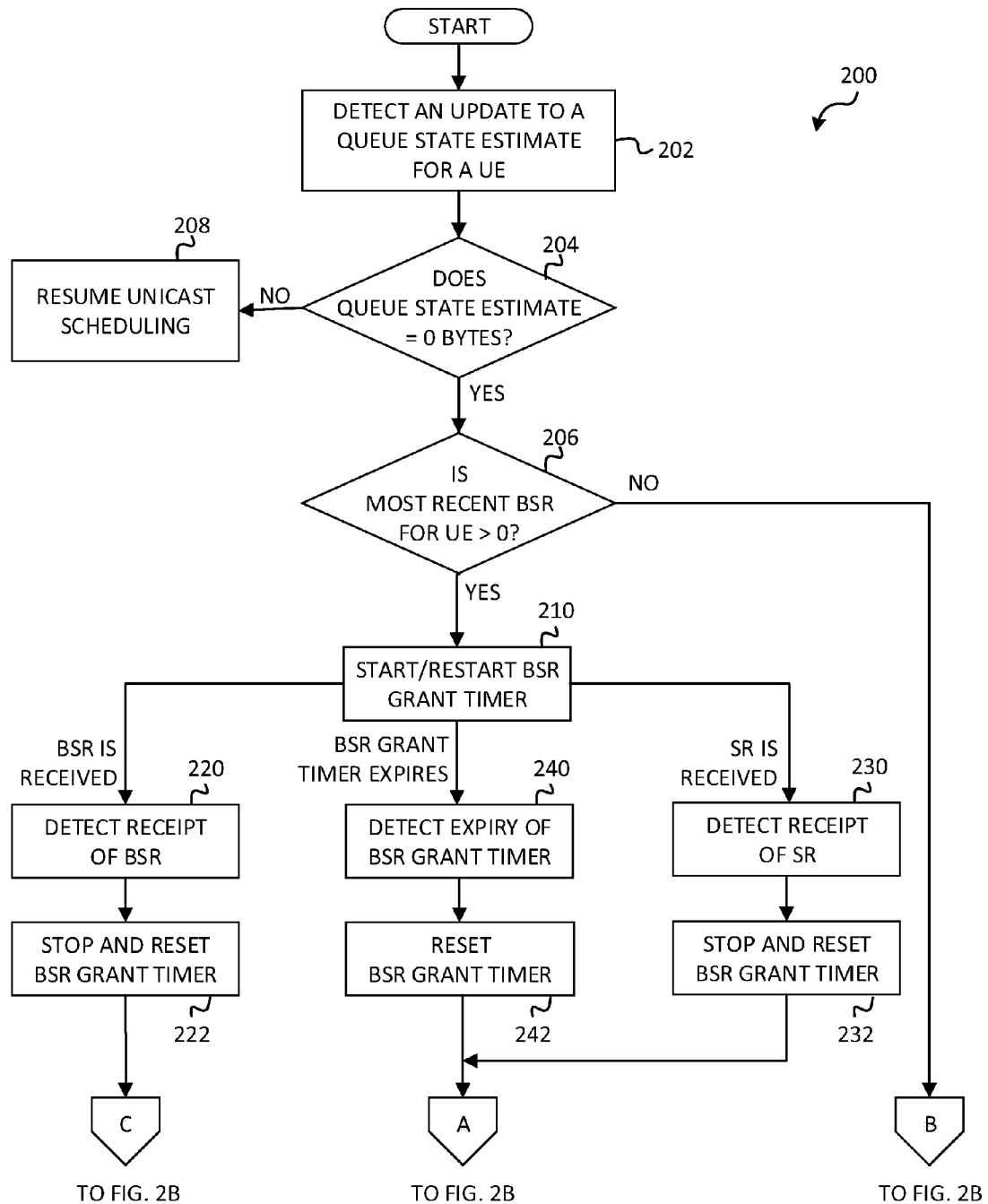
FIGS. 2A-2B are simplified flowcharts illustrating possible operations that may be associated with at least one embodiment according to the disclosure.
Figure 2B:
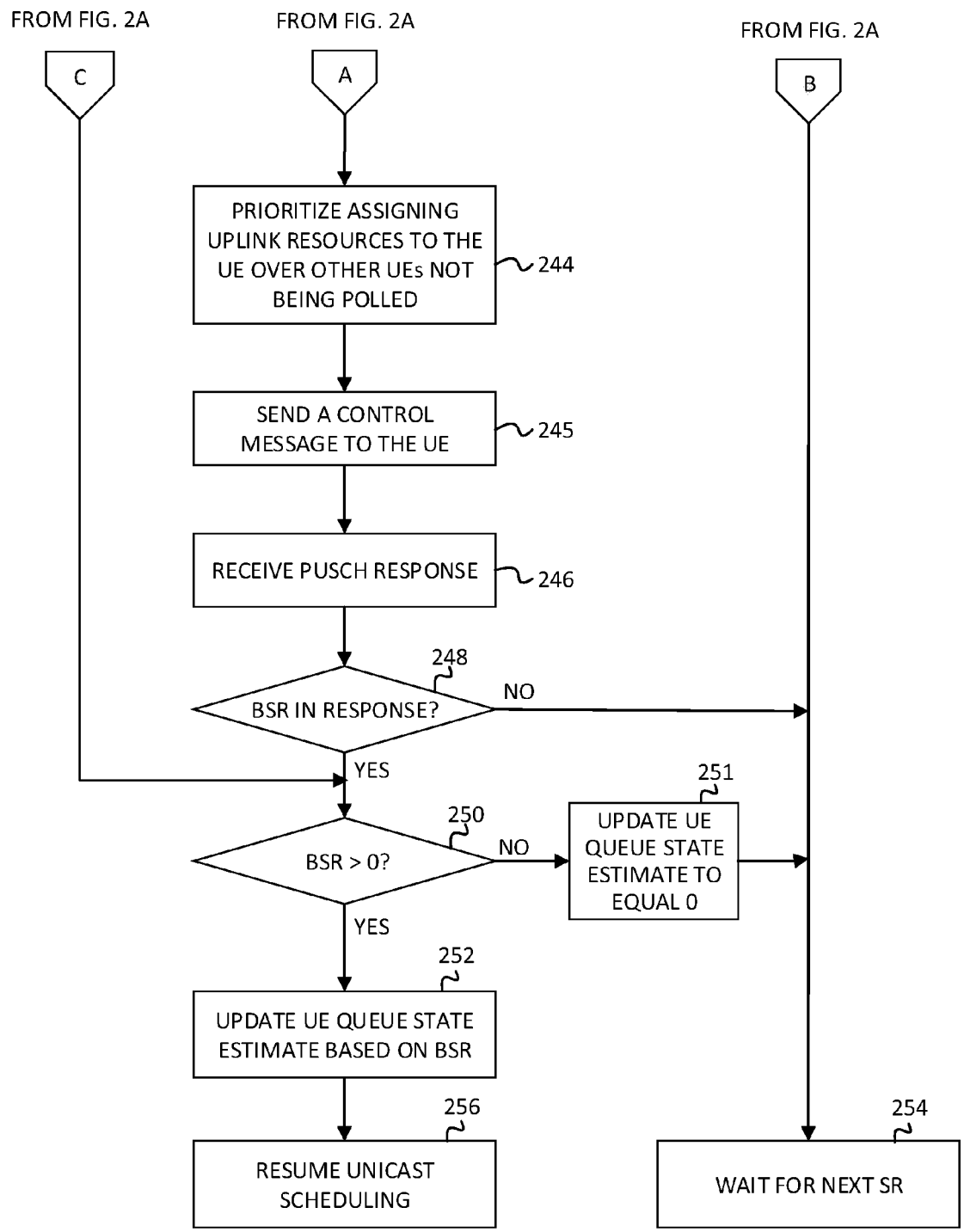

Turning to FIGS. 2A-2B, FIGS. 2A-2B are simplified flowcharts illustrating a flow 200 of possible operations that may be performed in accordance with at least one embodiment of communication system 100. One or more sets of operations correspond to activities of FIGS. 2A-2B. In at least one embodiment, eNodeB 30 may comprise means such as one or more processors (e.g., processor 37), for performing the operations. In one example, at least some operations shown in flow 200 may be performed by control logic 32, BSR grant timer 34, and scheduler 36 when executed by one or more processors such as processor 37.

In at least one embodiment, flow 200 may be performed in an eNodeB each time the eNodeB updates a queue state estimate for a UE. For example, when radio communications are established between UE 20 and eNodeB 30 to enable UE 20 to communicate with a remote node (e.g., another UE in a cellular network, a server via the Internet, etc.), eNodeB 30 keeps a current estimate of the queue state of UE 20. The eNodeB may initially send an uplink grant to UE 20 after receiving a scheduling request that indicates the UE has, in the recent past, had newly arrived data for a high priority logical channel, or has had newly arrived data which has changed its cumulative queue state from zero to non-zero, available for transmission. UE 20 can respond to the uplink grant by sending data and a BSR that indicates the queue state of UE 20. The eNodeB can determine the queue state of UE 20 based on the BSR and can store, cache or otherwise save a queue state estimate. The queue state estimate can be updated by eNodeB 30 based on certain events to keep track of the queue state of UE 20. While the queue state estimate is non-zero, the eNodeB may keep sending uplink grants to the UE. Each time the eNodeB sends a new grant, the queue state estimate can be updated by subtracting the size of the grant from the current queue state estimate. Once the queue state estimate reaches zero, this implies that the UE has no more data available for transmission.

With reference to FIG. 2A, at 202, an update to a queue state estimate for a UE is detected at an eNodeB. When an update to the queue state estimate is detected, the eNodeB performs further operations to determine whether a BSR grant timer should be started and, ultimately, whether a control message should be sent to the UE. The BSR grant timer triggering criteria includes eNodeB's estimate that the queue state of the UE is equal to zero bytes and the most recent BSR for the UE indicating a UE queue state of non-zero.

At 204, a determination is made as to whether the queue state estimate is equal to zero bytes. If the queue state estimate is not equal to zero bytes, then the eNodeB resumes unicast scheduling based on the queue state estimate (or the previously reported queue state) at 208. Resuming unicast scheduling can include the eNodeB sending uplink grants, receiving responses from the UE that include data and possibly a BSR, and updating the UE queue state estimate. Flow begins again at 202, each time an update to the queue state estimate is detected.

If the updated queue state estimate is determined to equal zero bytes at 204, then at 206, a determination is made as to whether the last BSR received from the UE by the eNodeB indicated a queue state of greater than zero bytes (i.e., non-zero bytes). If the last BSR indicated the UE queue state was equal to zero, then at 254 in FIG. 2B, the eNodeB waits for another scheduling request from the UE.

If, however, the last BSR received from the UE by the eNodeB indicates non-zero bytes in at least one LCG of the queue, then flow passes to 210, where a BSR grant timer is started. Three different scenarios may occur while the BSR grant timer is running: 1) the eNodeB may receive a new BSR from the UE, 2) the BSR grant timer may expire, or 3) the eNodeB may receive a new SR from the UE.

In a first scenario, the eNodeB could receive a new BSR from the UE before the BSR grant timer expires. The new BSR could be received in a PUSCH response to a prior uplink grant from eNodeB. In this scenario, at 220, the receipt of the new BSR is detected. At 222, the BSR grant timer is stopped and reset to zero. When the BSR grant timer is stopped and reset, it waits to be restarted until the BSR grant timer triggering criteria are met again.

At 250, a determination is made as to whether the new BSR indicated a queue state of greater than zero bytes (i.e., non-zero number of bytes). If the new BSR indicates the UE queue state is equal to zero, then the UE's queue state estimate may be updated to equal zero at 251. Flow may then pass to 254, where the eNodeB waits for an SR from the UE. If, however, the new BSR indicates non-zero bytes in at least one queue, then flow passes to 252, where the UE queue state estimate is updated based on queue state information indicated in the BSR.

At 256, the eNodeB can resume unicast scheduling based on the queue state information indicated in the BSR (and updated in the queue state estimate). Resuming unicast scheduling can include the eNodeB sending uplink grants, receiving responses from the UE that include data and possibly a BSR, and updating the UE queue state estimate. Flow 200 can begin again at 202, when another update to the queue state estimate for the UE is detected.

In a second scenario, the BSR grant timer could expire before a BSR or SR is received at the eNodeB. At 240, the expiration of the BSR grant timer is detected. At 242, the BSR grant timer can be reset to zero. The BSR grant timer may be restarted when the BSR grant timer triggering criteria are met again.

Since this grant based mechanism is used to poll a UE and pull a BSR from the UE on an on-demand basis (i.e., when a BSR grant timer expires), a control message granting uplink resources to the UE may be issued with higher priority as compared to regular unicast scheduling. Accordingly, at 244, the UE may be prioritized over other UEs that are not being polled for queue state information due to a possible deadlock/stall occurrence. Any suitable prioritization technique may be used to prioritize UEs for which the BSR grant timer has expired, over UEs that are considered for unicast scheduling. In one example scheme, prioritization control logic can be provisioned in the eNodeB (e.g., as part of control logic 32) so as to bypass the scheduler metric computation that is typically performed to determine the list of candidate UEs eligible for unicast scheduling. The prioritization control logic could involve going through a list of UEs for which the BSR grant timer is expired and scheduling a subset of these UEs with higher priority relative to the UEs identified for unicast scheduling.

In another example scheme to prioritize UEs for which the BSR grant timer has expired, scheduler metrics may be used. For example, during resource assignment for uplink scheduling, the scheduler metric assigned to Radio Network Temporary Identifier (RNTI) and logical channel group tuples corresponding to a UE for whom a BSR grant timer has expired can be much higher than the scheduler metrics for other RNTI and logical channel group tuples for whom the triggering criteria for a control message have not been met. This ensures that, while the uplink resource blocks are assigned in order of descending values of scheduler metrics, the UEs for which a BSR grant timer has expired are assigned resources first.

At 245, a control message allocating uplink resources for transmitting its BSR, may be sent to the UE. The signaling of the control message from the eNodeB can occur via the Physical Downlink Control Channel (PDCCH) or the Enhanced Physical Downlink Control Channel (E-PDCCH) and is sent synchronously in response to detecting the BSR grant timer expiry. In at least one embodiment, the control message may include a small grant, relative to the maximum size grant the eNodeB has the capacity to send. Because the eNodeB has estimated the UE queue state to be zero bytes, the eNodeB does not know how much data is available for transmission in the LCGs of the UE. A large grant could potentially waste resources that could be used more equitably for other UEs with known data waiting for transmission. Thus, a smaller grant that has enough room to contain a BSR in addition to some smaller amount of data may be sent to the UE.

It will be apparent, however, that an embodiment could be configured to provide a control message with a grant for any size of data the UE is capable of sending. For example, in some embodiments, a control message provides uplink resources that are only large enough to contain a BSR. For example, in a different embodiment, a control message provides uplink resources that could be large enough to contain a BSR and a voice packet so as to minimize the latency for delay-sensitive data. In yet other embodiments, a control message could grant enough uplink resources to carry the maximum size of data the UE is capable of sending.

When the UE receives the control message, then if the UE's P-BSR timer has already expired, a P-BSR is triggered and the UE re-starts its P-BSR timer. A regular BSR may also be triggered at the UE. Based on the UE implementation, the UE may insert either the P-BSR or the regular BSR into the MAC protocol data unit (PDU) created in response to the control message. If the control message includes a grant big enough to accommodate all pending queue data at the UE, but not big enough to accommodate BSR MAC-CE+MAC header, then the UE may cancel all pending BSRs. In this case, only data is sent to the eNodeB and no BSRs are provided to the eNodeB in response to the control message. It should be noted that MAC-CE refers to a MAC Control Element, which is a special bit string in the MAC header.

At 246, the eNodeB receives a physical uplink shared channel (PUSCH) response to the control message. As indicated above, the response may include a BSR with data, or it may include only data if the grant size was large enough to accommodate all pending queue data at the UE, but not large enough to also accommodate a BSR. At 248, a determination is made as to whether the response includes a BSR. If no BSR is included, then the eNodeB infers from the response that the UE queue state has no data left. Since the queue state estimate is already equal to zero, at 254, no further action may be taken and the eNodeB can wait for the next SR from the UE.

If the response is determined to include a BSR at 248, then at 250, a determination is made as to whether the BSR in the response indicates a queue state of greater than zero bytes (i.e., queue state is non-zero number of bytes). If the BSR in the response indicates the UE queue state is not greater than zero bytes (i.e., queue state is zero bytes), then at 251, the UE queue state estimate can be updated to equal zero. Flow can then pass to 254, where the eNodeB waits for another SR from the UE. If, however, the BSR in the response indicates a queue state of non-zero bytes in at least one LCG, then flow passes to 252, where the UE queue state estimate is updated based on queue state information in the BSR. Unicast scheduling can resume at 256, where the eNodeB sends uplink grants, the UE responds by sending data and possibly a BSR, and the eNodeB updates its queue state estimate. Flow 200 can begin again at 202, when another update to the queue state estimate for the UE is detected.

In a third scenario after the BSR grant timer is started or restarted, the eNodeB could receive an SR from the UE before the BSR grant timer expires or a new BSR is received. An SR can be sent by the UE even when no scheduled uplink data transmission resource is available. The SR indicates that a regular BSR has been triggered in the UE, which implies that the UE queue contains data that is available for transmission. In this scenario, at 230, the receipt of the SR by the eNodeB is detected. At 232, the BSR grant timer can be stopped and reset to zero. When the BSR grant timer is stopped and reset, it waits to be restarted until the BSR grant timer triggering criteria are met again.

When an SR has been received, prioritization of the UE over other UEs that are not being polled for queue state information may or may not be performed at 244. The receipt of an SR indicates the UE has generated a BSR and has data to send. Thus, this scenario may not lead to a deadlock/stall occurrence. If prioritization is used, however, any suitable prioritization technique may be used, as previously described herein.

Flow can pass to 245, where a control message allocating uplink resources for transmitting its BSR may be sent to the UE and signaled via PDCCH or E-PDCCH. In this scenario, the control message is sent asynchronously in response to receiving an SR before the BSR grant timer expires. In at least one embodiment, the control message can include a small grant, relative to the maximum size grant the eNodeB could actually send, as previously described herein. The SR does not indicate how much data is available for transmission in the LCGs of the UE, and the last UE queue state estimate by the eNodeB was zero. Therefore, a small grant that has enough room to contain a BSR in addition to some smaller amount of data may be sent to the UE. In at least one embodiment, the control message granting uplink resources that is sent when an SR is received while the BSR grant timer is running may be similar (or the same) as a control message that is sent when the BSR grant timer expires prior to receiving an SR or new BSR, as previously described herein.

The remaining processing at 246-256 has also been previously described herein. Depending on the response from the UE to the control message, the eNodeB may wait for the next SR at 254 or continue sending uplink grants at 256. Flow 200 can begin again at 202, when another update to the queue state estimate for the UE is detected.

Figure 3:
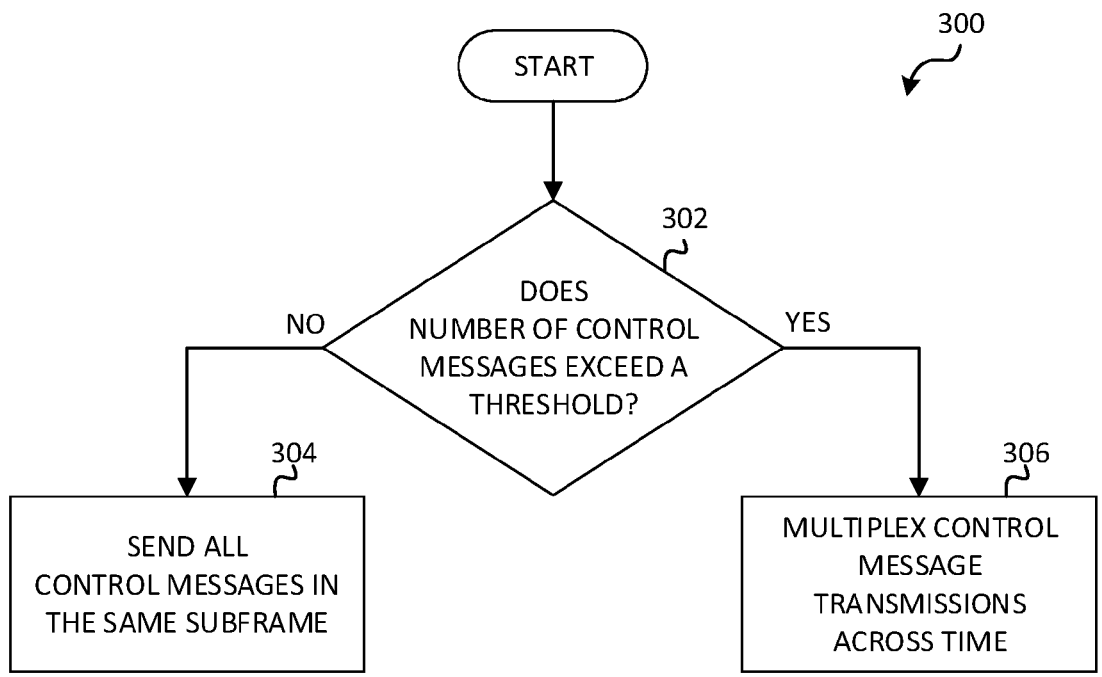
FIG. 3 is a simplified flowchart illustrating further possible operations that may be associated with at least one embodiment according to the disclosure.

FIG. 3 is a simplified flowchart illustrating a flow 300 of additional possible operations that may be performed in accordance with at least one embodiment of communication system 100. One or more sets of operations correspond to activities of FIG. 3. In at least one embodiment, eNodeB 30 may comprise means such as one or more processors (e.g., processor 37), for performing the operations. In one example, at least some operations shown in flow 300 may be performed by control logic 32 when executed by one or more processors such as processor 37.

In at least one embodiment, flow 300 may be performed in conjunction with 244 and/or 245 of flow 200. In some scenarios, multiple control messages providing uplink resources may be triggered at an eNodeB at the same (or substantially the same) time for different UEs. The eNodeB could have a limitation of an amount of uplink grants for UEs that can be scheduled on the uplink during a single TTI. Therefore, in order to avoid wasting resources, for a single TTI, the number of control messages to pull in BSRs (which could be P-BSRs, regular BSRs, or padding BSRs) may be balanced with a number of uplink grants, via unicast uplink scheduling, to pull in actual data.

At 302, a determination is made as to whether the number of control messages that are triggered exceeds a threshold. A control message is triggered for a UE when it is determined that resources need to be allocated to the UE to enable the UE to send its BSR to confirm the UE queue state estimate (e.g., when a BSR grant timer expires, when an SR is received after a BSR grant timer has been started/restarted but has not expired). If the number of control messages does not exceed the threshold, then at 304, the eNodeB can send all control messages that have been triggered to UEs for the same uplink TTI. In at least some embodiments, the threshold can be 1 so that at most, a single UE is given a control message in a given TTI.

If the number of control messages that have been triggered for UEs does exceed the threshold, then at 306, the control message transmissions can be multiplexed across time, in order to avoid wasting uplink capacity. For example, if the threshold is 1, then one control message for one UE can be sent for a given TTI along with other uplink grants for other UEs to pull in actual voice or data traffic. In the next frame, a different control message can be sent for a different UE.

Figure 4:
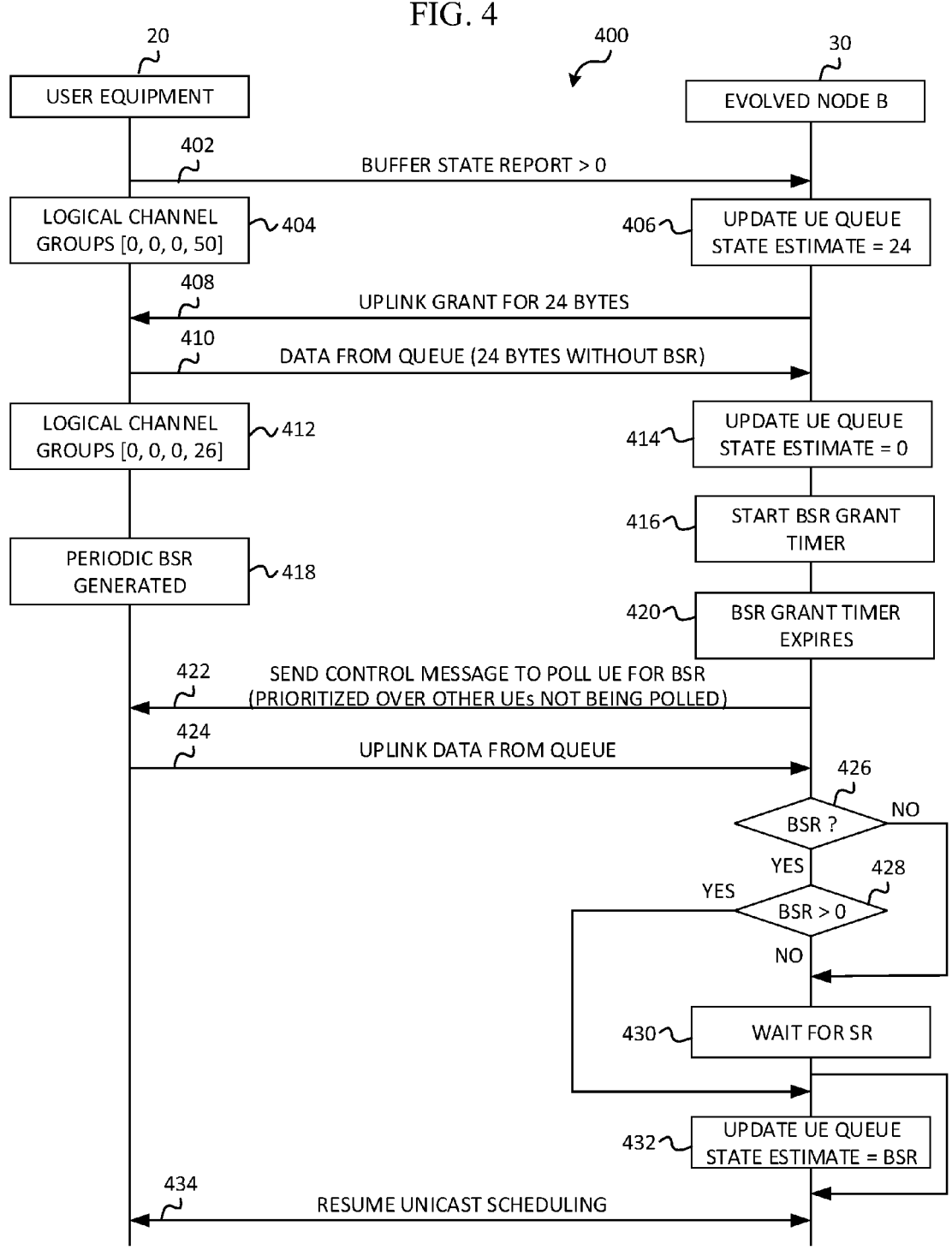
FIG. 4 is a simplified interaction diagram illustrating an example use case in the communication system.

FIG. 4 is a simplified interaction diagram illustrating an example use case in which a deadlock is resolved in accordance with an embodiment of communication system 100. Possible interactions and operations 400 that may occur are illustrated in accordance with at least one embodiment of communication system 100. One or more sets of operations correspond to interactions of FIG. 4. In at least one embodiment, UE 20 and eNodeB 30 interact to perform the interactions and operations 400 shown in FIG. 4.

When eNodeB 30 is performing unicast scheduling in order to facilitate the transmission of data at UE 20, at 402, a BSR may be sent to eNodeB 30 from UE 20. The BSR indicates the queue state of UE 20 to be greater than zero bytes. At some point, the actual queue state at UE 20 becomes out of sync with the UE queue state estimate at the eNodeB. At 404, the actual queue state for the four LCGs is [0, 0, 0, 50]. LCG-3 has 50 bytes and the other LCGs have 0 bytes. As shown at 406, however, the UE queue state estimate at the eNodeB is 24 bytes. This mismatch may occur when the eNodeB does not send a scheduling grant before additional data having the same or lower priority than existing data in LCG-3, is received at LCG-3. An SR is not triggered by UE 20 because its queue already contains data when the new data arrives and the new data arrival is for a logical channel which is not at a higher priority than the logical channel already containing data waiting to be transmitted.

At 408, eNodeB 30 sends an uplink grant for 24 bytes based on its UE queue state estimate. After receiving the uplink grant for 24 bytes, at 410, UE 20 can fill up the grant with data only and a padding BSR may not be generated. Following a Media Access Control (MAC) PDU generation, the UE's actual queue state (in order of LCG priority) is [0, 0, 0, 26], as shown at 412. Thus, 26 bytes are pending at LCG-3 at the UE.

At 414, the queue state of UE 20 as estimated at eNodeB 30 equals zero bytes based on the last scheduled uplink grant equaling or exceeding the last estimated queue state. However, no buffer status report (BSR) has been received on that UE's most recently decoded physical uplink shared channel (PUSCH). Hence, there is a state ambiguity at eNodeB 30 as to whether or not there is pending data at UE 20.

The following possibilities can occur: (a) No new data arrives at any LCG belonging to that UE and therefore, a regular BSR is not triggered; (b) Data becomes available for transmission at a higher priority logical channel than the logical channels belonging to LCG-3 of the UE and a regular BSR is triggered. However, an SR is not sent unless logicalChannelSR-Mask is not enabled for that LC and sr-ProhibitTimer is not running at the UE; or (c) New data arrives at LCG-3. In such a case, a regular BSR is not triggered. In (a), (c), and instances of (b) where the SR is not sent, there is no mechanism for the eNodeB to detect that the UE queue state is not empty.

In accordance with embodiments of this disclosure, when this deadlock scenario occurs, a BSR grant timer is started as indicated at 416. In at least one embodiment, the BSR grant timer is configured to ensure that the periodic BSR timer (e.g., P-BSR timer 24) at the UE has expired by the time a control message granting uplink resources has been received at the UE, leading to the creation of a P-BSR at the UE. In one example implementation, a BSR grant timer interval could equal the expiry interval of the P-BSR timer at the UE plus some delay to provide additional margin (BSR_GRANT_TIMER_INTERVAL=periodic_BSR_timer_interval+$\Delta$), where $\Delta$=delay. The periodic_BSR_timer_interval refers to the P-BSR expiry value periodicBSR-Timer as set via radio resource control (RRC). The delay $\Delta$, is a positive number to provide additional margin, such that it ensures a P-BSR is available for inclusion in the PUSCH response sent in response to the control message. In at least one embodiment, $\Delta$=periodic_BSR_timer_interval is sufficient. It will be apparent that any other $\Delta$ value greater than periodic_BSR_timer_interval could also ensure that a P-BSR timer expires and a P-BSR is triggered before a control message is received from the eNodeB.

While the BSR grant timer is running, at 418, a P-BSR is triggered at the UE when the P-BSR timer expires. The P-BSR is triggered prior to the BSR grant timer expiration at the eNodeB. This is due to the BSR grant timer interval being selected as previously described to ensure that P-BSR is generated at the UE before the expiration of the BSR grant timer.

In this example use case, the BSR grant timer expires at 420, without a BSR or SR being sent to the eNodeB from the UE during the BSR grant timer interval. The eNodeB prioritizes UE 20 over other UEs whose periodic BSR grant timers are still running or are being considered for unicast scheduling. At 422, the eNodeB then polls UE 20 for a BSR by sending a control message granting uplink resources to the UE. At 424, UE 20 sends uplink data from its logical channel queues to the eNodeB. In one scenario, UE 20 may generate a MAC PDU with the P-BSR and enough data from LCG-3 to fill the allocated resources provided by the control message at 422. The MAC PDU can be sent to the eNodeB on the uplink at 424. In another scenario, if the allocated resources are large enough to include all of the data in the UE queue but not large enough to also include the P-BSR (or another type of BSR), then the UE may generate the MAC PDU with all of the data in the UE queue (i.e., 26 bytes from LCG-3), but without a BSR. The MAC PDU can be sent to the eNodeB on the uplink at 424.

At 426, eNodeB 30 can determine whether the response includes a BSR by inspecting the contents of the MAC PDU if successfully received. If the response does not include a BSR, then flow passes to 430, and the eNodeB waits for another SR from the UE. Once an SR is received, the eNodeB can resume unicast scheduling at 434. If the response does include a BSR as determined at 426, then at 428, a determination is made as to whether the BSR indicates a queue state of greater than zero bytes. If the BSR indicates a queue state of zero bytes, then flow passes to 430, where the eNodeB waits for another SR from the UE. Once an SR is received, the eNodeB can resume unicast scheduling at 434. It should be noted that when the eNodeB receives an SR, the eNodeB may initially send a small grant in the form of a control message granting uplink resources to the UE in order to pull a regular BSR from the UE and update the UE queue state estimate.

If the BSR indicates the UE queue state as being greater than zero bytes, then at 432, the UE queue state estimate can be updated based on the queue state information indicated in the BSR. The eNodeB can then resume unicast scheduling at 434.

Variations and Implementations

In at least one example implementation, nodes with queue state estimation capabilities include logic to achieve (or to foster) the activities as outlined herein. Note that in at least one example, each of these elements can have an internal structure (e.g., processors, memory elements, network interface cards, etc.) to facilitate some of the operations described herein. In some embodiments, these activities may be executed externally to these elements, or included in some other network element to achieve this intended functionality. In at least one embodiment these nodes may include logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In certain example implementations, the queue state estimation capabilities outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, user equipment) can include memory for storing information to be used in achieving the queue state estimation capabilities, as outlined herein. Additionally, these elements may include at least one processor that can execute software, an algorithm, or other instructions to perform the queue state estimation operations, as disclosed herein. These elements may further keep information, to be used in achieving the queue state estimation capabilities as discussed herein, in any suitable memory element (e.g., random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, caches, buffers, queues, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements and user equipments. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components, as well as more complicated/sophisticated arrangements and configurations. Accordingly, the examples provided should not limit the scope or inhibit the broad teachings of the communication system as potentially applied to a myriad of other architectures or implementations.

As used herein, unless expressly stated to the contrary, use of the phrase 'at least one of' preceding multiple items refers to any combination of the named items (e.g., elements, conditions, activities, etc.). For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

It is also important to note that the activities, interactions, and operations shown and described herein illustrate only some of the possible scenarios and patterns that may be executed by, or within, the nodes with queue state estimation capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably.

The preceding operational flows have been offered for purposes of example and discussion. Substantial flexibility is provided by nodes with queue state estimation capabilities in that any suitable arrangements, chronologies, configurations, and timing mechanisms may be provided without departing from the teachings of the present disclosure. Additionally, these activities can be facilitated by various modules and/or components (e.g., control logic 32, scheduler 36, BSR grant timer 34, etc.) which can be suitably combined or divided in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of the queue state estimation system as disclosed herein.

What is claimed is:

1. A method, comprising:
   starting a first timer based on a queue state associated with a user equipment (UE) being estimated to equal zero bytes of data and based on a last buffer status report received from the UE indicating the queue state to be greater than zero bytes of data;
   sending a control message granting uplink resources to the UE if the first timer expires; and
   determining the queue state associated with the UE based, at least in part, on a response to the control message.

2. The method of claim 1, wherein the first timer expires if neither a scheduling request nor a buffer status report is received during a first timer interval after the first timer is started.

3. The method of claim 1, wherein the control message is sent to the UE if a scheduling request is received before the first timer expires.

4. The method of claim 1, further comprising:
   receiving a response to the control message from the UE; and
   updating a queue state estimate based on a new buffer status report if the new buffer status report is included in the response.

5. The method of claim 4, wherein the new buffer status report is triggered on the UE when a second timer on the UE expires before the first timer expires.

6. The method of claim 1, further comprising:
   receiving a response to the control message from the UE; and
   updating a queue state estimate to equal zero if a new buffer status report is not included in the response.

7. The method of claim 1, further comprising:
   prioritizing the UE to receive the control message over other user equipments (UEs) for which control messages have not been triggered.

8. The method of claim 7, wherein prioritizing the UE includes bypassing a computation of scheduling metrics that ranks the other UEs for which control messages have not been triggered.

9. The method of claim 7, wherein the UE is prioritized to receive the control message over the other UEs by assigning a higher weight to the UE during a computation of scheduling metrics that ranks the UE and the other UEs.

10. The method of claim 1, further comprising:
determining whether a number of control messages to be sent to respective user equipments (UEs) exceeds a threshold; and
multiplexing the control messages across two or more transmission time intervals if the number exceeds the threshold.

11. The method of claim 1, wherein, if a new buffer status report is received before the first timer expires, the control message is not sent and the first timer is stopped.

12. The method of claim 1, wherein the queue state is based on a number of bytes within logical channel groups of an uplink queue in the UE.

13. The method of claim 1, further comprising:
configuring a second timer on the UE so that, when started, the second timer runs based on a second timer interval, wherein a first timer interval of the first timer is defined to ensure that the second timer interval expires before the first timer.

14. The method of claim 1, wherein an evolved node B (eNodeB) starts the first timer and sends the control message to the UE.

15. The method of claim 1, further comprising stopping the first timer if a scheduling request or a buffer status report is received before the first timer expires.

16. At least one non-transitory machine readable storage medium including code for execution that, when executed by at least one processor, causes the at least one processor to perform operations comprising:
starting a first timer based on a queue state associated with a user equipment (UE) being estimated to equal zero bytes of data and based on a last buffer status report received from the UE indicating the queue state to be greater than zero bytes of data;
sending a control message granting uplink resources to the UE if the first timer expires; and
determining the queue state associated with the UE based, at least in part, on a response to the control message.

17. The at least one non-transitory machine readable storage medium of claim 16, wherein the operations further comprise:
receiving a response to the control message from the UE; and
updating a queue state estimate based on a new buffer status report if the new buffer status request is included in the response.

18. The at least one non-transitory machine readable storage medium of claim 16, wherein the operations further comprise:
receiving a response to the control message from the UE; and
updating a queue state estimate to equal zero if a new buffer status report is not included in the response.

19. An apparatus, comprising:
at least one memory element including control logic; and
at least one processor operable to execute instructions associated with the control logic to:
start a first timer based on a queue state associated with a user equipment (UE) being estimated to equal zero bytes of data and based on a last buffer status report received from the UE indicating the queue state to be greater than zero bytes of data;
send a control message granting uplink resources to the UE if the first timer expires; and
determine the queue state associated with the UE based, at least in part, on a response to the control message.

20. The apparatus of claim 19, wherein the first timer expires if neither a scheduling request nor a buffer status report is received during a first timer interval after the first timer is started.

* * * * *